United States Patent [19] … [11] Patent Number: 5,074,639
Smith … [45] Date of Patent: Dec. 24, 1991

[54] OPTICAL CABLE PROTECTIVE AND SUPPORTING DEVICE

[76] Inventor: Thomas J. Smith, Rte. 1, Box 180, Sandoval, Ill. 62882

[21] Appl. No.: 569,553

[22] Filed: Aug. 20, 1990

[51] Int. Cl.$^5$ .............................................. G02B 6/44
[52] U.S. Cl. ..................................... 385/100; 29/463
[58] Field of Search ............... 350/96.10, 96.20–96.23; 29/463

[56] References Cited

U.S. PATENT DOCUMENTS

| | | | |
|---|---|---|---|
| 4,469,465 | 9/1984 | Andrus | 403/282 |
| 4,606,111 | 8/1986 | Okazaki et al. | 29/463 |
| 4,614,016 | 9/1986 | Laing et al. | 29/463 X |
| 4,730,894 | 3/1988 | Arroyo | 350/96.23 |
| 4,733,020 | 3/1988 | Elzy | 174/136 |
| 4,744,695 | 5/1988 | Lindsey | 405/154 |
| 4,765,712 | 8/1988 | Bohannon, Jr. | 350/96.23 |
| 4,818,055 | 4/1989 | Patterson | 350/96.20 |
| 4,844,575 | 7/1989 | Kinard | 350/96.23 |
| 4,885,194 | 12/1989 | Tight, Jr. | 428/349 |
| 4,896,701 | 1/1990 | Young | 138/108 |
| 4,948,224 | 8/1990 | Modrey | 350/96.20 X |

Primary Examiner—Akm Ullah
Attorney, Agent, or Firm—Don W. Weber

[57] ABSTRACT

A means for encasing fiber optical cable is presented which provides both ease of installation and strength. The casing is made of two identical halves which are manufactured from standard angle iron. The two identical halves are joined together at the bottom by pinned hinges and at the top by off-set corresponding bolt holes and bolts. One end of the main casing has a male projection with bolt notches which is inserted into the female end of a second length of casing. The female end of the casing has bolt holes at the top and bottom. When bolts are inserted through the bolt holes and the outer female end is tightened about the inner male projection, a firm and secure connection between the two lengths of casing is accomplished. The pinned hinges on the bottom of the two halves allow the halves to open up so that the casing can be placed around the optical fiber cable. The two halves are then closed and clamped together to form a strong and permanent protection for the optical fiber cable.

5 Claims, 2 Drawing Sheets

OPTICAL CABLE PROTECTIVE AND SUPPORTING DEVICE

BACKGROUND OF THE INVENTION

With the advent of new technology in the optical cable field, the use of optical fiber cables has greatly increased. New telephone lines comprised of a number of optical cable fibers are integrated into lines carrying over one hundred and eighty different optical fibers each. Each line is encased with other lines until a large optical cable has been produced. Since the optical fiber is brittle any sagging or sharp bending in the line could cause the line to break. Because of the great importance to the communications industry of the optical cable itself, these cables are Federally protected. When they are exposed, it is not infrequent that an armed guard will be used to protect the cable. When other utilities need to dig under or around this large optical cable, many precautions are taken. An inspector is often kept at the site of the digging until the construction is completed. Additionally, special equipment may be needed to support the exposed cable to insure that it does not bend excessively, breaking the fibers inside the cable. If a cable breaks, it could cost the communications industry as much as $70,000.00 for each minute that the large optical cable is in a non-functioning condition. Digging under these cables creates a problem in that the cable should never bend or sag under its own weight.

There are several types of encasement devices used to help support the optical cables when they are exposed. One such device involves the use of a plastic or metal case which is essentially circular and which is hinged at the bottom. One hundred and eighty degrees from this hinge the case is cut and upper flanges are put on each semi-circular half. The cable may then be encased by the plastic or metal which is joined by bolts on the upper flange. To connect a number of pieces, a circular collar is bolted onto adjoining ends of the tubing. However, problems arise in the circular tubing connections. Oftentimes the collar does not fit tight enough and cannot be tightened so that a number of lengths of tubing can be connected to support the optical cable over a long distance. The very nature of plastic also makes it less advantageous when used in the above manner.

Another type of tubing has also been used for encasing the optical cable. This tubing is cut longitudinally down its length. The tubing may be forced open in order to encase the optical cable. However, the cable currently in use is very difficult to open and will often spring open or spring shut, causing a dangerous condition to occur to the workmen. Additionally, the method used to cut the tubing (whether sawing or other methods) produces heat which in turn can create warpage in the tubing. The warpage not only makes the tubing act like a spring when it opens, it can also distort the linearity of the tubing, thus causing bends in the length of the optical cable.

In most applications of encasement of optical fiber cable, the casing is left on permanently so that the valuable optical cable is protected. In certain trouble areas, for example ground washouts or where there are other utility lines present, it is a common practice to leave the casing to protect the optical cable and reduce the risk of the cable being broken or otherwise damaged.

There has been a long-felt need in the communications industry to develop a means for encasing optical fiber cable. This casing should be strong enough to permanently protect the cable, yet should be designed so that it may be easily and quickly installed around the optical fiber cable in need of protection. There is further a need to provide lengths of casing which may be securely attached to each other so that they can support the optical fiber cable over an expanse of distance frequently encountered in repair work.

It is an object of this invention to provide a casing for an optical fiber cable which is strong enough to support the cable over a long distance. It is also an object of this invention to provide a casing for a fiber optical cable which is easily and quickly installed and which causes no danger to the workman in the installation procedure.

It is a further object of this invention to provide a casing for fiber optical cable which may be rapidly deployed as the emergency need arises. Other and further objects of this invention will become obvious upon reading the following Specification.

BRIEF DESCRIPTION OF THE PREFERRED EMBODIMENT

The current invention comprises a number of lengths of casing for a fiber optical cable having an essentially square cross-section. The lengths, preferably ten feet each, are made up of identical L-shaped halves, each leg of the L-shaped half having an identical width. Angle iron has been found to be the most effective raw material for creating the square shaped cross-sections. The two identical halves of the casing are joined at the bottom by hinges and also have upper longitudinal bolt slots which hold the length of casing together. One end of each length of casing has an inner square shaped male projection. The male projection has upper and lower notches cut into it to accommodate the closing bolts. The other, female, end of the casing has a number of lateral bolt holes. When the male projection is inserted into the female end, the lateral bolt holes and closing bolt notches form a continuous circular passageway for a closing bolt.

In order to securely join the lengths of casing together, the outer female end is tightened by the closing bolts so that it is securely clamped to the inner male protruding end. Any number of lengths of casing may be firmly attached to each other in similar manner.

It has been found that the square shaped casing and the unique means of joining the lengths provide a strong and safe outer protection casing for optical fiber cable.

DETAILED DESCRIPTION OF THE PREFERRED EMBODIMENT

This invention comprises a number of identical lengths 1 of casing which are adapted to fit securely to each other by use of tightening bolts. Each length of casing is identical. The casings may come in any length, but the preferred length is ten feet (10') with a male projection 2 extending approximately an additional nine inches (9").

Figure 1:
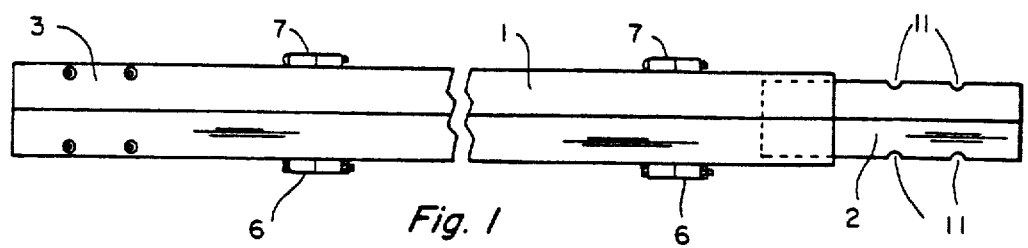
FIG. 1 is a side view of a standard length of casing.
Figure 5:
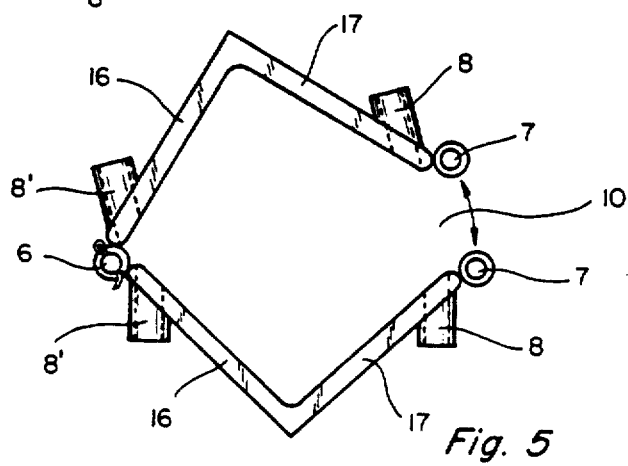
FIG. 5 shows an end view of the casing device with the identical halves slightly separated in preparation for receiving the fiber optical cable

Each length 1 of casing comprises two identical halves. Each half (5 and 5') comprises two perpendicular legs. Each leg has the same width, as shown on FIGS. 3, 4 and 5. Each identical half may be easily, and preferably, manufactured from angle iron. Once the two ten feet sections of angle iron have been cut, lower longitudinal off-set pinned hinges 6 are welded at the outer edge of corresponding abutting lower legs 16, as best shown on FIGS. 1 and 5. (FIG. 5 has been rotated ninety (90) degrees clockwise for purposes of illustration.) Welded to the outer edges of the remaining abutting upper corresponding perpendicular legs 17 are upper off-set longitudinal bolt holes 7, as best shown on FIGS. 1, 3 and 5. These lower pinned hinges 6 and upper bolt holes 7 are off-set from each other so that they form a continuous cylinder when the identical halves (5 and 5') are placed together. The lower pinned hinges are connected by means of a permanent pin while the upper longitudinal bolt holes are connected by means of a removable upper bolt 9. In placing the casing device around the optical fiber cable, the identical halves 5 and 5' are pulled apart to create an optical cable insertion opening 10, as best shown on FIG. 5. The lower pinned hinges 6 keep lower abutting legs 16 together while the upper longitudinal bolt holes 7, which have not yet been joined by the upper bolt 9, allow the upper legs 17 to separate, thus forming the optical cable insertion opening 10. Since the pinned hinges allow the two identical halves to open widely, the encasement of the optical fiber cable is done quickly and easily. Once a length of casing has been positioned so that the optical fiber cable runs longitudinally down the casing, the upper legs 17 may be joined by rotating the identical halves to the closed position, thus forming a square shaped cross-section as best shown on FIG. 3. Once the identical halves have been placed back into the position shown in FIG. 3, the upper bolts 9 may then be inserted through the upper longitudinal off-set bolt holes 7, thus forming a secure outer casing for the fiber optical cable.

Any number of lengths of casing may be placed around the optical fiber cable. The main body 1 of the casing has a male projection 2 at one end and a female end 3. The male projection 2 is manufactured by using angle iron of the same thickness. However, the width of the legs of the angle iron is cut down by a small amount so that the sides 18 of the male projection are shorter than the outer legs 16 and 17 of the main body 1.

Figure 2:
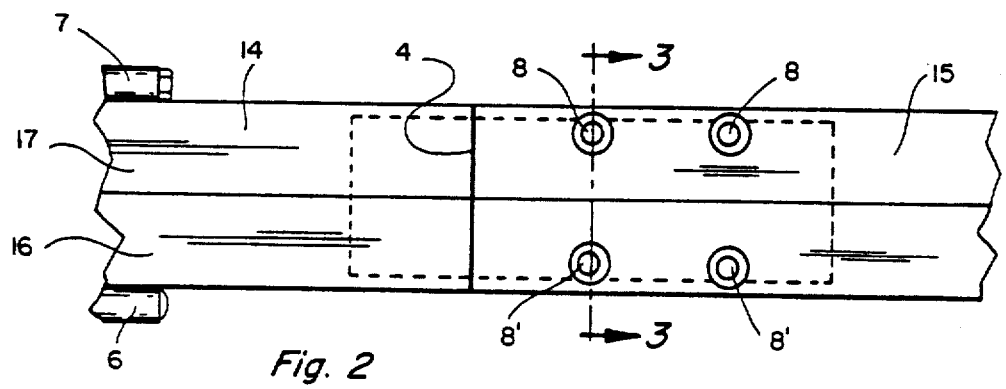
FIG. 2 is side view showing two lengths of casing as they are joined by the closing bolts.
Figure 3:
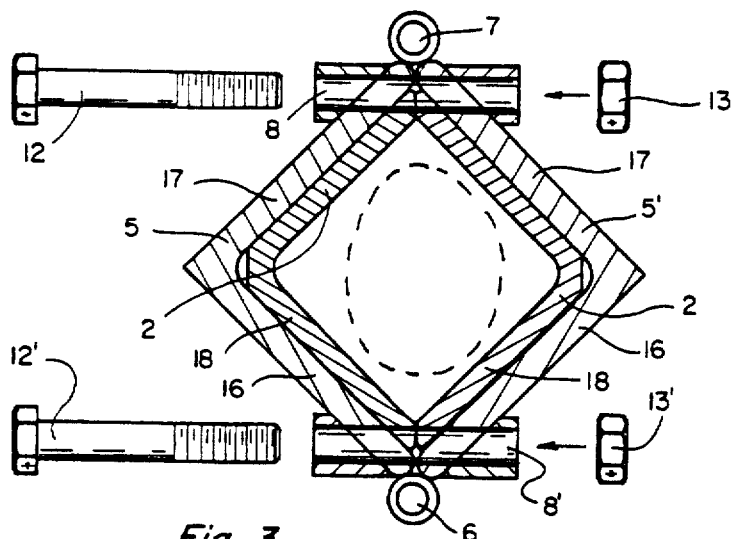
FIG. 3 is a cut away view taken along lines 3—3 of FIG. 2 showing the longitudinal bolt holes, pinned hinges and the lateral tightening bolt holes.
Figure 4:
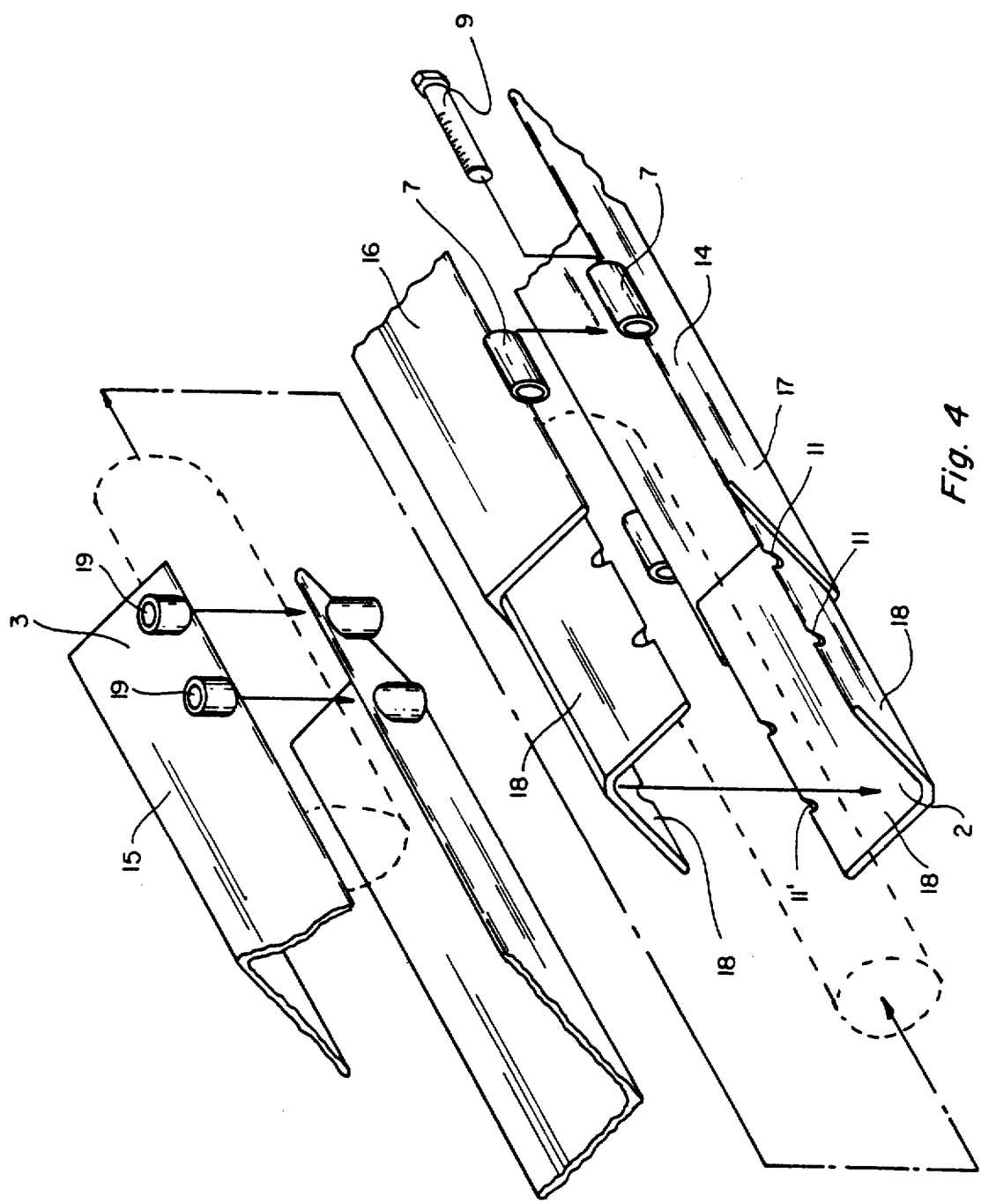
FIG. 4 is an exploded view of the male end of a first length of casing and the female end of a second length of casing.

A first length of casing 14 and a second length of casing 15 may be joined as shown on FIGS. 2 and 4. The male projection 2 of the first length of casing 14 is inserted into the female end 3 of a second length of casing 15. (On FIG. 3, the male projection 2 is shown by the dotted lines.) Once the first and second lengths of casing 14 and 15 have been joined, a joint 4 is formed. The second length of casing 15 must now be tightened about the male projection 2 of the first length of casing 14 to secure a strong and tight joint between the two lengths of casing. This tightening procedure is accomplished by means of lateral tightening bolt holes 8 and closing bolts 9.

Welded to corresponding lower 16 and upper 17 legs are upper 8 and lower 8' lateral tightening bolt holes. As shown on FIG. 3, these lateral tightening bolt holes are perpendicular to the lower longitudinal pinned hinges 6 and upper longitudinal bolt holes 7. These lateral tightening bolt holes are welded to the upper and lower legs and form cylindrical bolt receiving holes 19, best shown on FIG. 4. In order to accommodate the introduction of closing bolts 12 and 12' through the cylindrical bolt receiving holes 19, upper 11 and lower 11' corresponding closing bolt notches are cut into the male projection 2. As the male projection 2 is inserted into the female end 3 of another length of casing, the notches 11 and 11' and the lateral tightening bolt holes 8 and 8' respectively match up so that the upper 12 and lower 12' closing bolts may be inserted. Once these closing bolts are inserted, closing nuts 13 and 13' are attached. The first and second lengths of casing may then be tightened and secured to each other by normal means.

It has been found that the square shaped cross-section, as well as the positive tightening means including the notches on the male end and the closing bolt and nut, provides a firm joint. The various lengths of casing are securely attached to each other by means of the closing bolts and nuts, and are able to support the casing across a long length. Because of the unique male end notches, the lengths will not pull apart when once they have been tightened. Any number of lengths of casing may be attached in similar manner to span the distance required. Additionally, since the angle iron may come in many different lengths and sizes, the size of the cross-section may be tailored to accommodate the size of the particular optical cable involved, and the lengths may be cut to accommodate the proper longitudinal lengths required. While the preferred length of casing is 10 feet, any other length may also be used and is within the contemplation of this invention. While the square cross-sections are preferred, the inventor does not mean to limit or restrict the cross-sections which may be embodied in this particular invention. In the preferred embodiment, the lower pinned hinges and upper longitudinal bolt holes are spaced at approximately one foot (1') intervals. However, this dimension is meant as a means of limitation only and not as a limitation to the invention claimed herein.

An approximate relative size of the optical cable is shown by the dotted lines in FIGS. 3 and 4. Such optical cable is well known in the art and is described in U.S. Pat. Nos. 4,948,244 and 4,765,712.

It is anticipated that each ten foot (10') length of casing will be of heavy gauge metal. The standard weight of a ten foot (10') length of casing is approximately 125 pounds.

Having fully described my invention, I claim:

1. A device for encasing fiber optical cable, comprising a length of casing having two identical halves, wherein each half comprises identical upper and lower perpendicular legs;
    a means for hingedly joining the outer edge of abutting corresponding lower legs;
    a means for joining the outer edges of abutting corresponding upper legs;
    said casing having a male projection at one end and an opposite female end, said female end further comprising a means for tightening the identical halves about a male projection.

2. A device for encasing fiber optical cable, as in claim 1, wherein said casing has a square cross-section.

3. A device for encasing fiber optical cable, as in claim 1, wherein said hinge means comprises off-set corresponding hinge cylinders and pins.

4. A device for encasing fiber optical cable, as in claim 1, wherein said joining means comprises off-set corresponding cylindrical bolt receiving holes and bolts.

5. A device for encasing fiber optical cable, as in claim 1, wherein said male projection has bolt notches cut therefrom and wherein said female ends further comprises corresponding lateral tightening bolt holes and closing bolts and nuts, whereby first and second lengths of casing are tightened together by inserting said closing bolts through said corresponding bolt holes and notches and tightening said nuts.

* * * * *